United States Patent [19]

Vodila et al.

[11] Patent Number: 4,997,328

[45] Date of Patent: Mar. 5, 1991

[54] SELF-LOCKING WASHER AND METHOD OF USE

[75] Inventors: James M. Vodila, Summerville, S.C.; John D. Huyett, McMurray, Pa.

[73] Assignee: The United States of America as represented by the United States Department of Energy, Washington, D.C.

[21] Appl. No.: 360,554

[22] Filed: Jun. 2, 1989

[51] Int. Cl.⁵ .............................................. F16B 43/02
[52] U.S. Cl. ..................................... 411/539; 411/169; 411/973; 29/525.1
[58] Field of Search ............................. 411/142, 92–95, 411/531, 539, 973, 169, 546; 384/626; 24/563; 29/525.1

[56] References Cited

U.S. PATENT DOCUMENTS

| 174,560 | 3/1876 | Onions . | |
| 238,506 | 3/1881 | Jones et al. | 411/94 |
| 427,611 | 5/1890 | Procter . | |
| 559,629 | 5/1896 | Spragg . | |
| 582,545 | 5/1897 | Page | 411/144 |
| 1,748,412 | 2/1930 | Crawford | 384/626 |
| 3,276,181 | 10/1966 | Gilbert | 411/539 |
| 4,436,467 | 3/1984 | Larsson | 411/34 |
| 4,558,548 | 12/1985 | Hieger | 52/235 |

Primary Examiner—Neill R. Wilson
Attorney, Agent, or Firm—James C. Haight; William R. Moser; Richard E. Constant

[57] ABSTRACT

A self-locking washer made of a flat elongated piece of material having a slot in one end of it. The washer is designed so that it can be placed underneath bolts or nuts which are already installed without completely removing the bolt or nut. A method of use of the self-locking washer is also disclosed.

5 Claims, 1 Drawing Sheet

SELF-LOCKING WASHER AND METHOD OF USE

BACKGROUND OF THE INVENTION

This invention generally relates to washers and to a self-locking washer and its use.

Occasionally after mechanical equipment is assembled, it will be discovered that bolts are too long to tightly draw together the components they are connecting. A common solution to this problem would be to install washers in order to make up for the gap or to put in shorter bolts. Sometimes, however, the bolts are in difficult or totally inaccessible locations or for other reasons the bolts cannot be removed to add ordinary washers or to substitute shorter bolts. At other times the bolts may be in a hazardous or hostile environment, such as a radiation field or high temperature situation, such that the time required to correct the problem must be minimized. When any of these situations occur, one thing that can be done is to install split washers. However, ordinary split washers are themselves difficult to install. When the bolts are tightened they tend to spin out from the bolt head due to the compression of the washer and the rotation.

The invention described below overcomes these problems.

SUMMARY OF THE INVENTION

The invention is a self-locking washer designed to be used in any application where complete removal of bolts or nuts for washer installation is undesirable. Also, disclosed is a procedure for use of this washer.

BRIEF DESCRIPTION OF THE DRAWINGS

Reference is made to FIGS. 1 and 2 for a detailed description of the invention. In FIG. 1 item 1 is a bolt having a shaft or shank 4. Reference numeral 5 identifies a surface into which the bolt is inserted. Numeral 3 identifies a surface of a wall or other protrusion or object above surface 5. Item 2 is the washer or shim which is one of the subject inventions of this disclosure. It consists of a generally rectangular piece of flat material of substantially uniform thickness. A slot generally indicated by numeral 6 is cut into one of the long edges of the rectangular material. The slot is of a width sufficient to allow the washer to be slidably engaged with and slipped over shaft 4 while the shaft is still inserted into the surface 5. Preferably the slot is of a width slightly larger than the diameter or width of the shaft so that the washer fits snugly around the shaft. The bottom of the slot preferably has a semicircular shape of approximately the same radius of curvature as the shaft on which it is designed for use. However, it could be flat or of almost any shape.

The slot 6 is placed closer to one end of the rectangular piece of material than to the other end giving the washer a short end on one side of slot 6 and a long end on the other side of slot 6. The distance D from the center of the shaft 4 (when the washer is engaged with the shaft at the bottom of the slot) to any peripheral edge of the washer on the short end of the washer should be less than the distance H from the center of the shaft to the closest point of surface 3. The distance (for instance L) from the center of the shaft to at least one point along the periphery of the long end of the washer should be greater than the distance H. The thickness of the washer and the actual dimensions vary according to the particular application. The washer may be made of metal or any other material suitable to perform normal washer functions.

Figure 1:
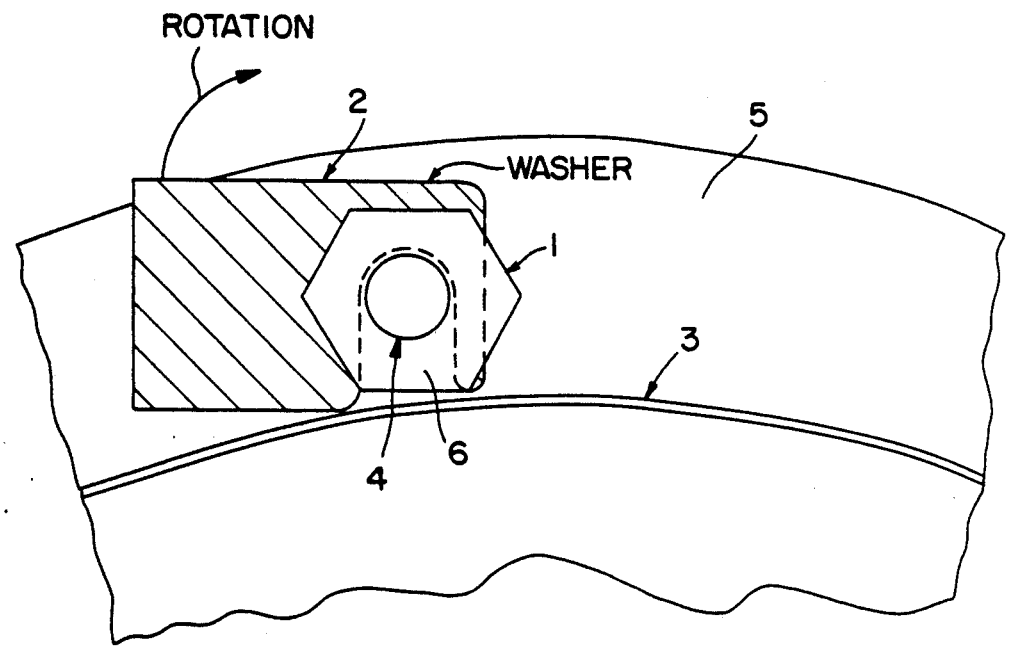
FIG. 1 shows the self-locking washer after it has initially been set in place.
Figure 2:
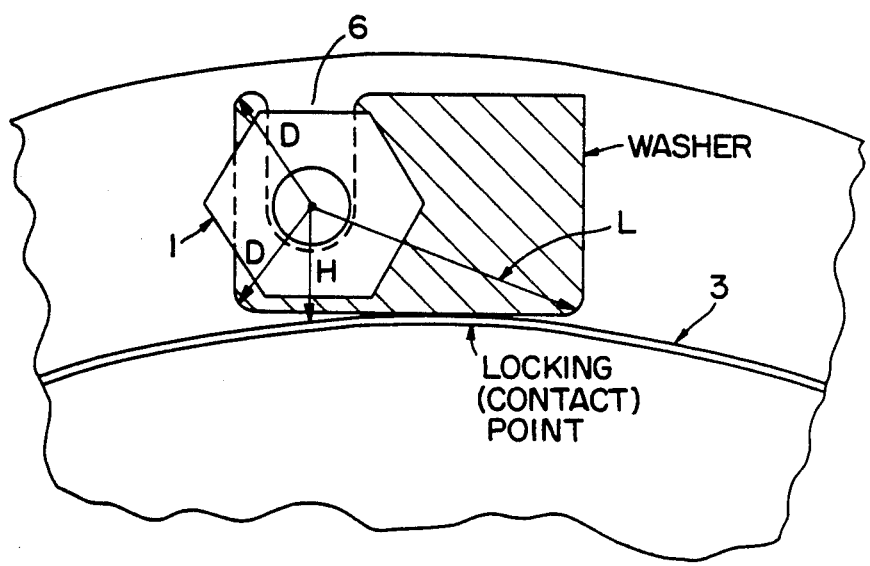
FIG. 2 shows the self-locking washer after it is locked in place.

In a typical operation the following would occur. A bolt which is drawn down would be backed off a minimal distance allowing space between the bolt and surface 5. The slotted washer 2 would then be slipped into the space created between the bolt and surface 5. The slotted end of the washer would be slipped over the shaft 4 as, for instance, illustrated in FIG. 1. Next the washer would be manually rotated into a position near or at the locked position. Then the bolt would be tightened. The tightening process causes the washer to rotate until the long end of the washer comes into contact with the surface 3 (FIG. 2) which blocks further rotation (Of course if the washer were already at the locked position no further rotation would occur). The washer is now locked into position. As the bolt is further tightened the washer is drawn-in tighter to the shaft thus preventing the washer from spinning out.

While the washer has been described for use between a bolt head and a surface it should be recognized that it could be used between a nut and a surface. Also, while the preferred embodiment of the washer is generally rectangular in shape, any elongated shape will perform the necessary function provided the relative dimensions D, L, and H recited above are retained. The foregoing description of a preferred embodiment of the invention has been presented for purposes of illustration and description. It is not intended to be exhaustive or to limit the invention to the precise form disclosed, and obviously many modifications and variations are possible in light of the above teaching. For example, the embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A self-locking washer shim in combination with a bolt capable of being tightened by rotating against said washer shim and in which the bolt has a bolt shaft radially spaced from a fixed surface, wherein:
  a) the washer shim consists essentially of a generally rectangular piece of flat material having a substantially uniform thickness, the material having a single, off-center slot cut perpendicularly into a long edge of said rectangle to form a short end on one side of the slot and a long end on the other side thereof, and in which the slot is of a width slightly larger than the diameter of the bolt shaft and the bottom of the slot has a semicircular shape of approximately the same radius as the bolt shaft; and
  b) the bolt shaft is engaged with the bottom of said slot such that:
   i) the distance from the center of the shaft to a peripheral edge of the washer shim on the short end thereof is less than the distance from the center of the shaft to the closest point of said fixed surface; and
   ii) the distance from the center of the shaft to at least one point along a peripheral edge of the washer shim on the long end thereof is greater than the distance from the center of the shaft to the closest point of said fixed surface, wherein the washer shim is capable of rotating upon tightening the bolt thereagainst until the longer end of the washer shim contacts said fixed surface and the washer shim can lock into place against said surface.

2. A self-locking washer shim for use with a bolt which has been previously installed into a surface but has been provided with a space between the bolt head or nut and said surface and where a relatively rigid fixed object exists above the surface comprising: a flat piece of material of uniform thickness having long sides and a short side, one of said long sides having a single slot formed into it at a point closer to one end of that long side than to the other end of that long side, said material being dimensioned such that said slot may be fitted over the shank of said bolt into said space between the bolt head or nut and the said surface and on retightening the bolt the washer can rotate until its rotation is stopped by contact with said fixed object thus locking the washer in place.

3. A self-locking washer shim as in claim 2 wherein the width of the slot is slightly larger than the diameter of the shank of the bolt.

4. A self-locking washer shim as in claim 3 wherein the sides of the slot are parallel and the bottom is curved.

5. A method of adding a washer, shim to an installed bolt or nut comprising the steps of
    (a) providing a space between the bolt head or nut and the surface into which the shaft of the bolt extends, said space being slightly wider than the width of the washer to be installed,
    (b) locating a relatively rigid fixed object which rises above said surface,
    (c) selecting a washer comprised of a flat elongated piece of material having an off-center slot such that one dimension of said washer measured from the center of said bolt or nut, when the washer is installed, to one edge of the washer is greater in length than the distance from the center of said bolt or nut to said fixed object and the distance from the center of said bolt or nut to the opposite edge of the washer is less than said distance from the center of said bolt or nut to the said fixed object,
    (d) inserting the selected washer into said space by sliding the slotted area over the shaft of the bolt until the shaft rests on the bottom of the slot,
    (e) tightening the bolt or nut while allowing the washer to rotate until the longer end of the washer contacts said fixed object and,
    (f) continuing to turn the bolt or nut until it has the desired tightness.

* * * * *